United States Patent [19]

Daley

[11] 4,129,935
[45] Dec. 19, 1978

[54] METHOD OF MAKING A MOLDED SUPPORT FOR AN OBJECT USING A SELF-CLOSING VALVE

[76] Inventor: Thomas G. Daley, 9716 Lanesboro Way, Louisville, Ky. 40222

[21] Appl. No.: 825,663

[22] Filed: Aug. 18, 1977

[51] Int. Cl.² .......................... B23P 3/00; B23P 19/04
[52] U.S. Cl. ....................................... 29/460; 206/320; 248/346; 264/46.6
[58] Field of Search ...................... 29/458, 460, 155 R; 264/46.6, 46.7; 206/320; 248/346, 19, 119 R

[56] References Cited

U.S. PATENT DOCUMENTS

| | | | |
|---|---|---|---|
| 2,845,657 | 8/1958 | Beare | 29/460 UX |
| 2,910,730 | 11/1959 | Risch | 264/46.6 |
| 3,007,208 | 11/1961 | Urban | 264/46.7 X |
| 3,132,382 | 5/1964 | Magester | 264/46.6 X |
| 3,498,626 | 3/1970 | Sullivan | 264/46.6 X |
| 3,621,557 | 11/1971 | Cushman et al. | 29/460 |
| 3,921,279 | 11/1975 | Daley | 29/458 |
| 4,030,187 | 6/1977 | Daley | 29/460 |
| 4,033,023 | 7/1977 | Slaughter et al. | 264/46.6 X |

Primary Examiner—Charlie T. Moon
Attorney, Agent, or Firm—Charles G. Lamb

[57] ABSTRACT

A method for making a support for an object wherein a hollow conduit member having closed ends has cut therein an opening to receive resilient foam reacting materials therethrough. In the cutting of the hollow member, a flap remains at the opening so that upon reacting of the foam mix, the foam rises or increases in volume forcing the flap into its original position thereby closing the opening. In a preferred embodiment the hollow conduit member includes at preselected positions therein hollow inserts arranged with axes at right angles to the axes of the hollow conduit member, the inserts being surrounded by the resilient foam materials.

7 Claims, 7 Drawing Figures

METHOD OF MAKING A MOLDED SUPPORT FOR AN OBJECT USING A SELF-CLOSING VALVE

BACKGROUND OF THE INVENTION (1) Field of the Invention

This invention relates to a method of preparing supports for objects, particularly support runners for appliances for use during shipment of large appliances. Even more particularly, this invention relates to a method of preparing supports for objects using foam reacting materials and preparing said supports by injecting the reacting materials through a self-closing valve in a wall of a hollow support member.

(2) Description of the Prior Art

In the shipment of hard goods, such as major appliances, these goods are generally mounted onto disposable runners or skids which absorb shock and prevent damage to the goods during said shipment. In the past, the most common support runners for large hard goods was made of strips of wood with a shock absorbing material, such as a resilient foam, sandwiched between the goods and the runners. However, with the increasing cost of wood in the manufacture of these runners, it has been necessary to find more economical means for support of these goods. One particular support which has been found useful is described in U.S. Pat. No. 3,921,279. This patent teaches a support which is a hollow member with resilient foam at preselected portions therein.

SUMMARY OF THE INVENTION

In the present invention, it is recognized that it is desirable to provide a method for making a support for hard goods. It is further recognized that it is desirable to provide a method for making a support for hard goods utilizing a hollow member with means to inject a strong, resilient foam material therein.

The present invention advantageously provides a straightforward arrangement for a support for hard goods which is economical to manufacture and yet has improved support characteristics. The present invention further provides a method for injecting a resilient foam mix into a hollow support member. The present invention even further provides for using a self-closing valve in a hollow member through which a resilient foam mix is added therethrough and closes upon rising of the foam during the foaming reaction.

Various other features of the present invention will become obvious to those skilled in the art upon reading the disclosure set forth hereinafter.

More particularly, the present invention provides a method for making a support for an object comprising the steps of: providing a hollow member having closed ends for addition of a resilient foam mix therein; cutting an opening in the hollow member leaving a flap therein over the opening; adding a predetermined amount of the resilient foam through the opening; and, curing the resin mix whereby rising foam during the curing forces the flap into its original position prior to cutting thereby closing the opening.

It is to be understood that the description of the examples of the present invention given hereinafter are not by way of limitation. Various modifications within the scope of the present invention will occur to those skilled in the art upon reading the disclosure set forth hereinafter.

BRIEF DESCRIPTION OF THE DRAWING

Referring to the drawing.

DESCRIPTION OF THE PREFERRED EMBODIMENT

Figure 1:
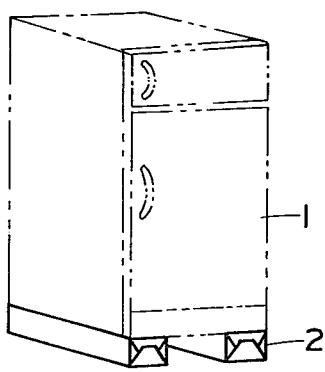
FIG. 1 is a perspective view illustrating a preferred object support of the present invention with an object mounted thereon.

In FIG. 1 of the drawing, an object, such as a refrigerator 1, is shown mounted onto a pair of supports 2 of the present invention.

Figure 2:
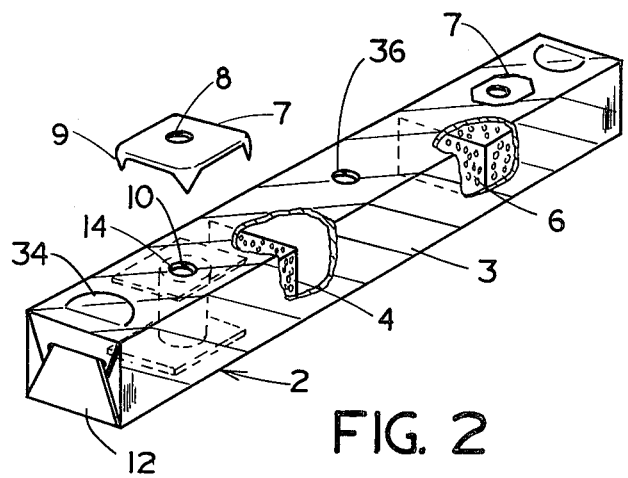
FIG. 2 is a perspective view, with selected portions cut-away, of an object support member of the present invention.
Figure 3:
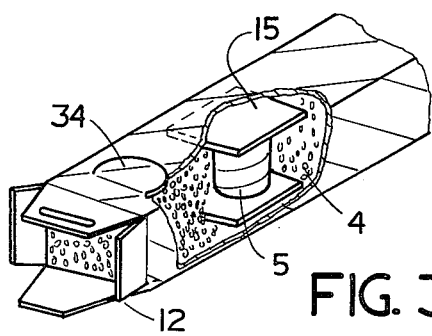
FIG. 3 is a perspective view, partially cut-away, of one end of the object support member of FIG. 2.

In FIGS. 2 and 3, one support 2 shown in FIG. 1 is illustrated with selected portions cut-away. The support 2 of the present invention includes a hollow conduit member 3 which is exemplified by a fifty point semi-chemical recycled container board of rectangular configuration. The rectangular-shaped conduit member 3 is generally convolute wound. At substantially each end of the tube 3 is a preselected resilient foam portion identifiable by numerals 4 and 6 with a cylindrical tube 5 having an axis at right angles to the axis of the tube 3 surrounded and held in place by the foam. The method for inserting the tube 5 and a foam mix for foaming the foam portions 4 and 6 will be discussed hereinafter. One preferred resilient foam is a polyurethane and the tube 5 is generally a heavy gauge fiberboard formed in layers bonded together or heavy caliper cylinderboard. The resilient foam portions in combination with the vertically extending tube 5 are provided to maintain the spiral member 3 in a preselected geometric configuration with an object, such as the refrigerator 1, mounted thereto. It has been found that by using a tube 5 which is a heavy gauge fiberboard, the support can hold up to seven refrigerators mounted vertically thereon. Also, the tube 5 is in alignment with an opening 14 in the member 3 thereby providing a mounting bolt cavity.

Provided along the top side of the member 3 is a pair of mounting plates 7, mounting plates 7 being included for receiving bottom mounting surfaces of the hardware which is to be supported. The mounting plates 7 are shown as being 0.025 inch steel with corners 9 bent at approximately 90° to the mounting surface and embedded into the member 3. Generally, the mounting plate 7 including opening 8 therethrough is in alignment with the opening 10 in the vertically extending cylindrical tube 5. The opening 10 is disposed therein for receiving a leveling or mounting bolt (not shown) therethrough. The bolts are generally mounted through selected apertures in the bottom mounting surface of the object which is to be mounted onto the support. As exemplified, the mounting plates 7 are rectangular in shape, but it is realized that other configurations may also be utilized. Furthermore, it is even further realized that for some applications mounting plates may not be necessary and the object to be supported may be mounted directly to the partially foam filled conduit member with the vertically extending cylindrical tubes 5 therein.

Generally, resilient foam portions 4 and 6 are disposed only at each end of the support member 2. However, in certain instances where the object to be mounted thereto is long, heavy, or protection against a relatively large degree of shock is necessary, additional preselected portions of the member 3 may include the resilient foam therein.

Also, embedding the mounting plates 7 into the top surface of the member 3 with the bent corners 9 is usually sufficient to maintain the mounting plates 7 in place. However, in certain instances it may be necessary to adhesively secure the plates 7 to the member 3 by means of, for example, a "hot melt" glue. Such glues or adhesives are well known in the art and it is only necessary that they form a strong bond between the underside of the plates 7 and the outer surface of the member 3 to hold the plates 7 in place.

Resilient foam portions 4 and 6 may be formed of any suitable resilient foamed material. A polyurethane foam is a preferred material since it has been found that it has the most desirable characteristics of foam materials presently available on the market. It is to be understood, of course, that other resilient foamed materials may be entirely suitable for use in the support depending upon the sensitivity of the object to be carried. Thus, for instance, foamed polyethylene, expanded polystyrene, foam rubber and the like may also be used.

It is realized that the tube 5 may be of unitary construction and fitted tightly into the end of the member 3 with the opening 10 in alignment with opening 14 and the member 3 of the tube 5 may include a flat solid plate member 15 sandwiched between the tube 5 and the inner surface of member 3. The flat solid plate member 15 is utilized to keep a leveling or mounting bolt (not shown) from pulling out of the member 3 during impact. Plate member 15 may be metallic, plastic, wood or the like, but one preferred member 15 is a heavy resin-impregnated fiberboard pad adhesively secured on one face to the tube 5 and adhesively secured on the opposed face to the inner surface of member 3.

The member 3 is provided with integral interlocking end flaps as designated by the numeral 12 which prevents the reacting foam from leaking out the end of the member 3 during the foaming reaction.

Figure 4:
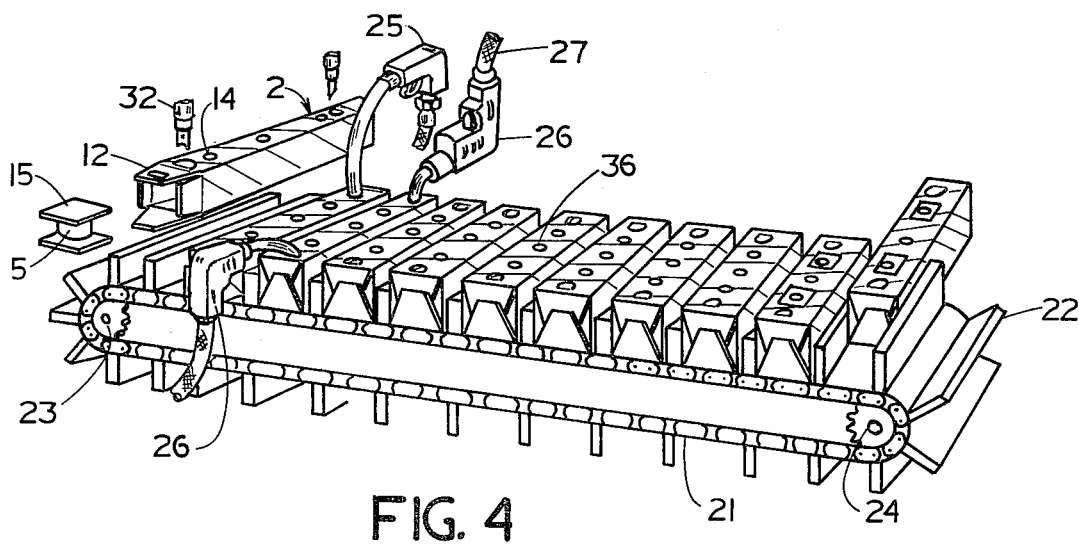
FIG. 4 is a diagramatic representation of one preferred apparatus for manufacturing an object support of the present invention; and, FIGS. 5, 6, and 7 are sectional views showing a foaming reaction within a hollow conduit member of the present invention.

FIG. 4 illustrates one preferred apparatus utilized in the making of an object support member of the present invention. In a preferred embodiment a conveyor 21 with a plurality of flights 22 thereon are provided for movement about a pair of rolls 23 and 24, one of said rolls, exemplified as roll 24, being driven by a suitable motor driving means (not shown). The cross-sectional area between the flights 22 corresponds substantially to the cross-sectional area of the spirally wound hollow member 3 which is inserted therebetween. Furthermore, the length of the flights 22 are generally the same length as the spirally wound members 3.

In the process for making an object support member of the present invention, a hollow circuit member 3 has cut therein at each end thereof an opening 30 by cutting machines 32. The opening 30 is not cut all of the way around and a self-closing filler valve or flap 34 is left. The opening 30 is sufficiently sized and adapted to receive a foam filling probe 26 (to be discussed hereinafter) therein.

A pair of flat plate members 15 are attached to each end of a tube 5 with a "hot melt" adhesive, generally selected from the group consisting of hide glues, bone glues, polyethylene base binders, polypropylene base binders, ethylene vinyl acetate binders, and the like, as well as other thermoplastic adhesives that flow at elevated temperatures, such as 350° F., but upon chilling harden and become tacky. The tube 5 with the plate member 15 attached thereto is then placed within the member 3, each tube 5 having its axis disposed vertically in alignment with an opening 14 in member 3. A "hot melt" adhesive is added to the outer surface of the member 15 which is in contacting relationship with the inner surface of member 3, but this is usually not necessary if the tube 5 and plate member 15 are constructed for a tight fit into member 3.

Figure 5:
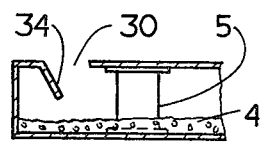
Figure 6:
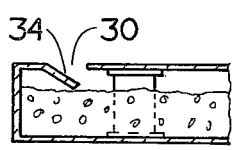
Figure 7:
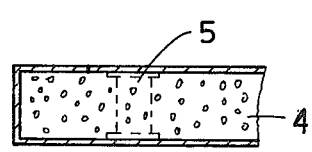

The hollow member 3 is then mounted between two flights 22 at the end of the conveyor and end flaps 12 are interlocked. The hollow member 3 on the conveyor 21 moves to a position adjacent to pre-heat air gun 25 wherein gun 25 is inserted into the hollow member 3 through the opening 30. Pre-heated compressed or blown air is then forced into the member 3 whereby the temperature of the inner surface of member 3 is brought to a temperature sufficient to start the reaction of the foaming mix which is to be added later in the process. It is noted that when utilizing a polyurethane foam mix, the pre-heated air is utilized to bring the temperature of the inner surface of member 3 to a temperature of at least 110° F. When the inner surface of the hollow member 3 has been brought to the reacting temperature, a foam filling probe 26 attached to a conduit 27 which is in fluid communication with the reactant mix (not shown) is inserted into the hollow member 3 through opening 30, probe 26 being activated at the preselected positions to completely surround and enclose the tube 5, the foam mix being sprayed around the inner surface of the hollow member 3 at said location for a preselected period of time thereby covering a preselected portion of the member 3. Even though two probes 26 are shown, it is realized that in many instances only one probe 26 is used, in which case probe 26 is inserted first in one end through opening 30 around tube 5 then the other. Once the probe 26 is removed support member 3 continues along the conveyor 21 wherein the reaction mix cures as shown in FIGS. 5, 6 and 7. Generally, an opening 36 is provided within the hollow member 3 to provide means for escape of the gases formed during the curing of the polyurethane mix.

As the support 3 nears the discharge end of the conveyor 21, mounting plates 7 are added in any conventional manner to the support member 3.

It is realized that in the method of making the support of the present invention, the cutting of opening 30 may occur before or after the insert of tube 5 into the hollow member 3. Furthermore, it is realized that the end flaps 12 may be closed before or after cutting the opening 30 without departing from the scope and spirit of my invention.

It is even further realized that other changes may be made to the specific embodiment shown and described without departing from the principles of the present invention.

What is claimed is:

1. A method for making a support for an object comprising the steps of:
   (a) providing a hollow member having closed ends for addition of a resilient foam mix therein;
   (b) cutting an opening in said hollow member leaving a flap therein over said opening;

(c) adding a predetermined amount of said resilient foam mix through said opening; and, (d) curing said resin mix whereby rising foam during said curing forces said flap into its original position prior to cutting thereby closing said opening.

2. The method of claim 1 including the steps of treating with heat the inner surface of said hollow member to a preselected temperature prior to adding said resilient foam mix.

3. The method of claim 1, said resilient foam mix being a mixture wherein the resulting foam product is a polyurethane foam material.

4. A method for making a support for an object comprising the steps of:

(a) providing a hollow member having open ends for addition of a resilient foam mix therein;

(b) inserting into said hollow member at preselected positions therein inserts with an opening therethrough, the axes of said opening and said hollow member being at right angles to one another;

(c) cutting an opening in said hollow member leaving a flap therein over said opening;

(d) closing the ends of said hollow member;

(e) adding a predetermined amount of said resilient foam mix through said opening; and, (f) curing said resin mix whereby rising foam during said curing forces said flap into its original position prior to cutting thereby closing said opening.

5. The method of claim 4 wherein said insert includes a solid plate member over each end thereof.

6. A method for making a support for an object comprising the steps of:

(a) providing a hollow member having open ends for addition of a resilient foam mix therein;

(b) cutting an opening in said hollow member leaving a flap therein over said opening;

(c) inserting into said hollow member at preselected positions therein inserts with an opening therethrough, the axes of said opening and said hollow member being at right angles to one another;

(d) closing the ends of said hollow member;

(e) adding a predetermined amount of said resilient foam mix through said opening; and, (f) curing said resin mix whereby rising foam during said curing forces said flap into its original position prior to cutting thereby closing said opening.

7. A method for making a support for an object comprising the steps of:

(a) providing a hollow member having open ends for addition of a resilient foam mix therein;

(b) inserting into said hollow member at preselected positions therein inserts with an opening therethrough, the axes of said opening and said hollow member being at right angles to one another;

(c) closing the ends of said hollow member;

(d) cutting an opening in said hollow member leaving a flap therein over said opening;

(e) adding a predetermined amount of said resilient foam mix through said opening; and, (f) curing said resin mix whereby rising foam during said curing forces said flap into its original position prior to cutting thereby closing said opening.

* * * * *